United States Patent
Arimoto et al.

(10) Patent No.: US 7,043,118 B2
(45) Date of Patent: May 9, 2006

(54) OPTICAL COMMUNICATION APPARATUS

(75) Inventors: Akira Arimoto, Tokyo (JP); Masahiro Fushimi, Tokyo (JP)

(73) Assignee: PENTAX Corporation, Tokyo (JP)

( * ) Notice: Subject to any disclaimer, the term of this patent is extended or adjusted under 35 U.S.C. 154(b) by 164 days.

(21) Appl. No.: 10/441,093

(22) Filed: May 20, 2003

(65) Prior Publication Data

US 2003/0219201 A1    Nov. 27, 2003

(30) Foreign Application Priority Data

May 22, 2002  (JP)  .............................. 2002-147335
Aug. 30, 2002  (JP)  .............................. 2002-252865

(51) Int. Cl.
   *G02B 6/26*  (2006.01)

(52) U.S. Cl. .......................................... 385/31; 385/52

(58) Field of Classification Search .................. 385/31
   See application file for complete search history.

(56) References Cited

U.S. PATENT DOCUMENTS

| | | | |
|---|---|---|---|
| 4,067,044 A | | 1/1978 | Maeda et al. |
| 4,223,187 A | | 9/1980 | Yonezawa et al. |
| 4,364,118 A | | 12/1982 | Maeda et al. |
| 5,097,291 A | * | 3/1992 | Suzuki .......................... 355/69 |
| 5,537,504 A | * | 7/1996 | Cina et al. ..................... 385/93 |
| 5,615,192 A | | 3/1997 | Kikukawa et al. |
| 5,997,185 A | | 12/1999 | Kropp |
| 6,081,638 A | * | 6/2000 | Zhou ........................... 385/31 |
| 6,819,815 B1 | * | 11/2004 | Corbalis et al. ............... 385/16 |

FOREIGN PATENT DOCUMENTS

| | | |
|---|---|---|
| JP | 60-246688 | 12/1985 |
| JP | 61-136566 | 8/1986 |
| JP | 4-502069 | 4/1992 |
| JP | 5-313080 | 11/1993 |
| JP | 5-333232 | 12/1993 |
| JP | 7-174942 | 7/1995 |
| JP | 7-270642 | 10/1995 |
| JP | 2002-107582 | 4/2002 |
| JP | 2002-107583 | 4/2002 |
| WO | 90/06529 | 6/1990 |

OTHER PUBLICATIONS

"Dual Beam Laser Diode Scanning System for Ultrahigh Speed Laser Beam Printers Using a Spot Control Method", Arimoto et al., Applied Optics, vol. 26, No. 13, Jul. 1, 1987.

* cited by examiner

*Primary Examiner*—John R. Lee
*Assistant Examiner*—Phillip A. Johnston
(74) *Attorney, Agent, or Firm*—Greenblum & Bernstein, P.L.C.

(57) ABSTRACT

There is provided an optical communication apparatus, which is provided with a light emitting device that emits a transmission light signal modulated with transmission data, an optical fiber, and a deflecting system that is located between the light emitting device and the optical fiber so as to move a position of the transmission light signal on an entrance surface of the optical fiber. The optical communication apparatus is further provided with a feedback control system that controls the deflecting system so as to move the position of the transmission light signal to a center of a core of the optical fiber based on intensity of a portion of the transmission light signal.

20 Claims, 11 Drawing Sheets

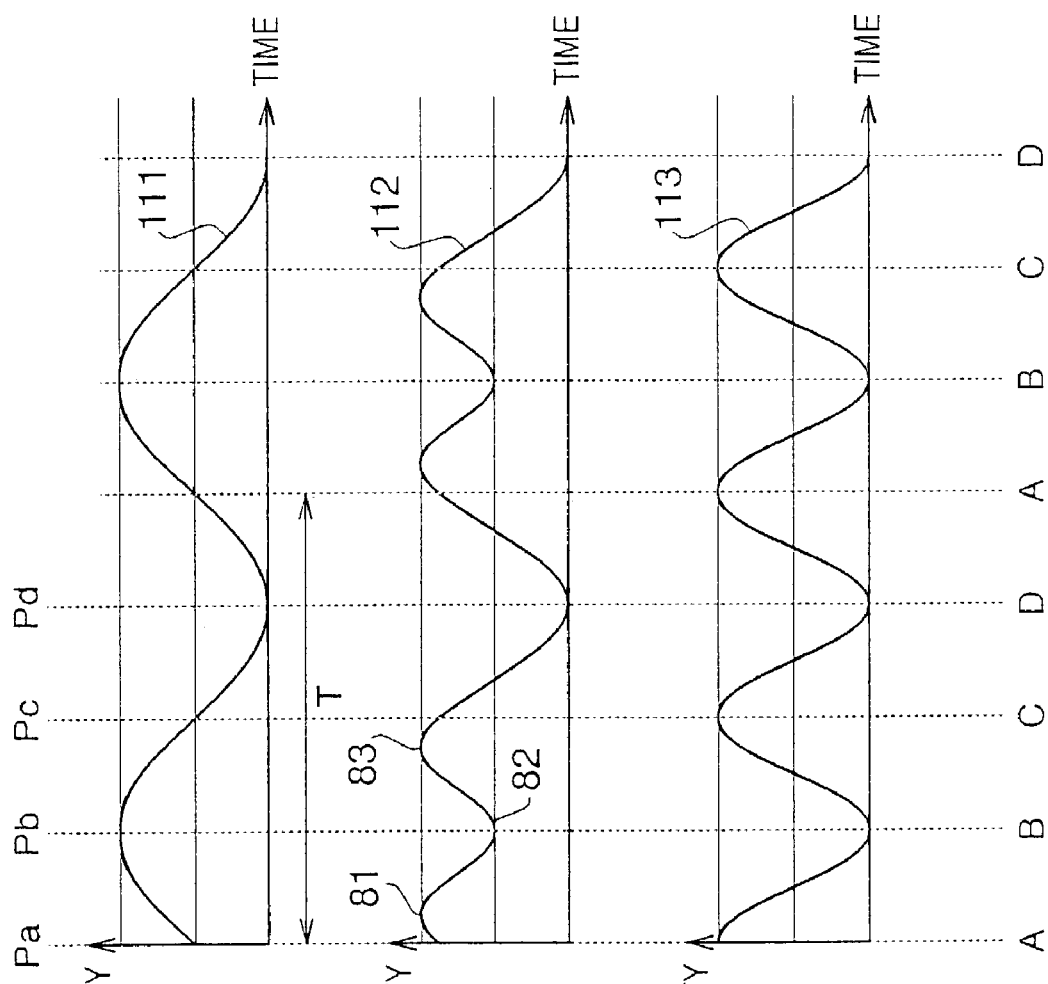

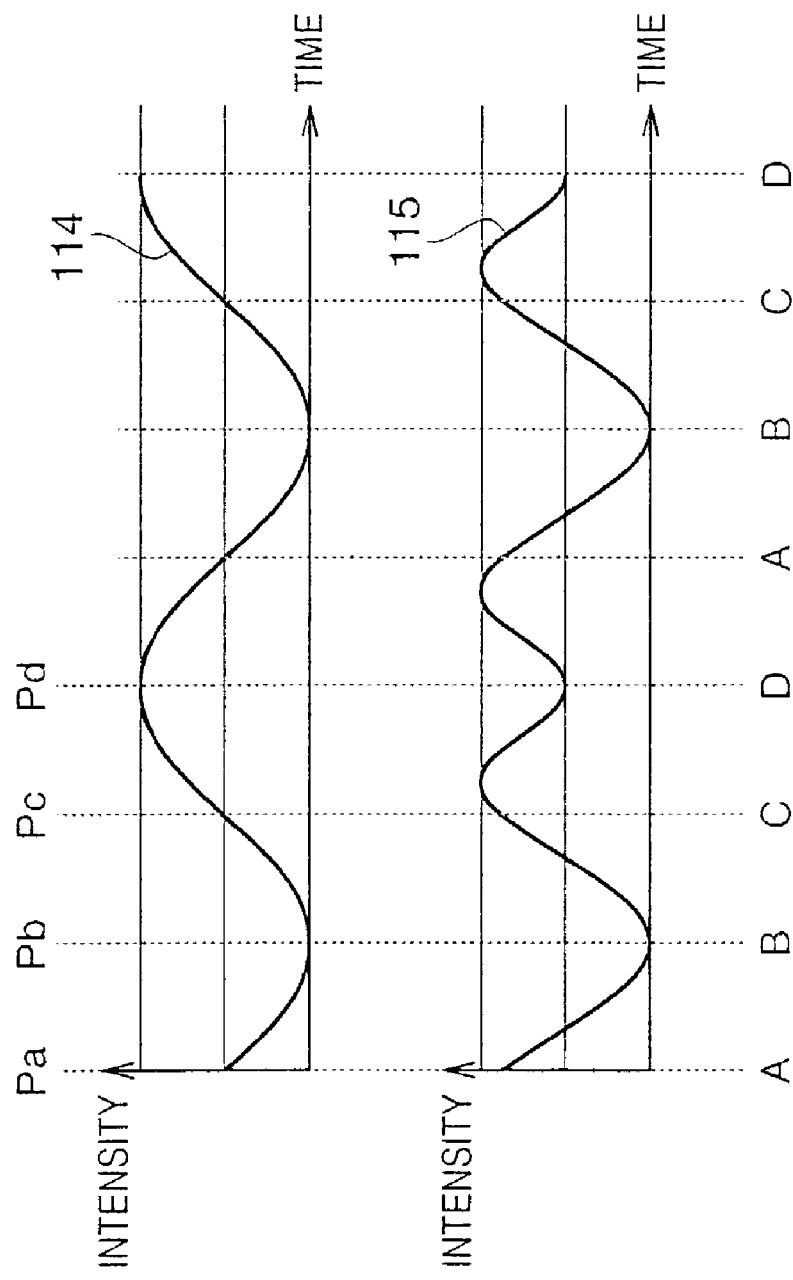

OPTICAL COMMUNICATION APPARATUS

BACKGROUND OF THE INVENTION

The present invention relates to an optical communication apparatus used for optical communications.

Recently, an optical communication module for optical communications has been used widespread. In general, such optical communication module is provided with a semiconductor laser and a condenser lens which converges laser light emitted by the semiconductor laser on an entrance surface of an optical fiber.

A type of an optical communication module employed in an ONU (Optical Network Unit) for bidirectional optical communications includes a WDM (Wavelength Division Multiplexing) filter and a light receiving device in addition to the semiconductor laser and the condenser lens.

Such optical components provided in the optical communication module must be accurately aligned with the optical fiber. Typically, in manufacturing process of the optical communication module, such optical components are securely fixed on a base of the optical communication module by welding or by using an adhesive after the optical components are accurately aligned with the optical fiber.

However, even though the optical communication module is fabricated with high accuracy by using the above-mentioned manufacturing process, some problems to be solved arise. Firstly, if the optical components in the optical communication module are fixed by using the adhesive, it can not be determined whether the optical communication module passes or fails a test until the adhesive sets. Further, high production yields of such type of the optical communication module can not be expected due to difficulty of the above-mentioned manufacturing process.

Secondly, if a positional relationship of the optical components in the optical communication module varies with age and therefore performance of the optical communication module deteriorates, the performance of the optical communication module can not be restored because the optical components are securely fixed.

Accordingly, an optical communication module, which is configured to keep high performance and not to cause deterioration of performance depending on environmental conditions such as ambient temperature, mechanical conditions, variation with age and the like, is required.

SUMMARY OF THE INVENTION

The present invention is advantageous in that it provides an optical communication module which is configured to keep high performance and not to cause deterioration of performance depending on environmental conditions.

According to an aspect of the invention, there is provided an optical communication apparatus, which is provided with a light emitting device that emits a transmission light signal which is modulated with transmission data, an optical fiber having an entrance surface into which the transmission light signal enters, and a deflecting system that is located between the light emitting device and the optical fiber so as to move a position of the transmission light signal on the entrance surface of the optical fiber. The optical communication apparatus is further provided with a feedback control system that controls the deflecting system so as to move the position of the transmission light signal to a center of a core of the optical fiber based on intensity of a portion of the transmission light signal emitted by the light emitting device.

With this configuration, the position of the transmission light signal on the entrance surface of the optical fiber can be moved so that the transmission light signal is located at the center of the core of the optical fiber.

In a particular case, the intensity of the portion of the transmission light signal may be detected by the feedback control system after the transmission light signal enters the entrance surface of the optical fiber.

Optionally, the optical fiber may have a light extracting portion from which the portion of the transmission light signal is extracted. The intensity of the portion of the transmission light signal extracted from the light extracting portion of the optical fiber is detected by the feedback control system.

Still optionally, the light extracting portion may include a half mirror formed in the optical fiber. The intensity of the portion of the transmission light signal reflected by the half mirror is detected by the feedback control system.

Alternatively, the light extracting portion may include a fiber coupler through which the portion of the transmission light signal is directed to the feedback control system.

In a particular case, the feedback control system may produce a wobbling motion of the position of the transmission light signal on the entrance surface using the deflecting system so as to detect a change of the intensity of the portion of the transmission light signal during the wobbling motion, the wobbling motion having a predetermined frequency smaller than a frequency band of optical communications using the transmission light signal. In this structure, the feedback control system obtains position data of the transmission light signal with respect to the center of the core of the optical fiber based on the detected change of the intensity during the wobbling motion, the position data being used to move the position of the transmission light signal to the center of the core of the optical fiber.

Optionally, the deflecting system may be configured to move the position of the transmission light signal on the entrance surface in a first direction and in a second direction perpendicular to the first direction. Further, the feedback control system performs a first feedback control in which the wobbling motion is produced in the first direction so as to detect the change of the intensity of the portion of the transmission light signal during the wobbling motion in the first direction, and performs a second feedback control in which the wobbling motion is produced in the second direction so as to detect the change of the intensity of the portion of the transmission light signal during the wobbling motion in the second direction.

With this structure, in the first feedback control, the change of the intensity detected during the wobbling motion in the first direction is used to obtain a first position information of the transmission light signal with respect to the center of the core of the optical fiber in the first direction, the first position information being used to move in the first direction the position of the transmission light signal to the center of the core of the optical fiber. Further, in the second feedback control, the change of the intensity detected during the wobbling motion in the second direction is used to obtain a second position information of the position of the transmission light signal with respect to the center of the core of the optical fiber in the second direction, the second position information being used to move in the second direction the position of the transmission light signal to the center of the core of the optical fiber.

Still optionally, the feedback control system may perform the first feedback control and the second feedback control alternately. In this case, when the first feedback control is performed, the position of the transmission light signal in the second direction is held at a position which corresponds to a result of a preceding second feedback control. Further, when the second feedback control is performed, the position of the transmission light signal in the first direction is held at a position which corresponds to a result of a preceding first feedback control.

In a particular case, the deflecting system may include a condenser lens that forms a beam spot of the transmission light signal on the entrance surface of the optical fiber, and an actuating system that moves the condenser lens so as to move the beam spot on the entrance surface of the optical fiber. In this structure, the feedback control system moves the condenser lens using the actuating system so as to move the beam spot to the center of the core of the optical fiber based on the intensity of the portion of the transmission light signal.

Alternatively, the deflecting system may include a galvano mirror that reflects the transmission light signal emitted by the light emitting device toward the entrance surface of the optical fiber, and an actuating system that moves the galvano mirror so as to move the position of the transmission light signal on the entrance surface of the optical fiber. In this structure, the feedback control system moves the galvano mirror using the actuating system so as to move the position of the portion of the transmission light signal on the entrance surface.

In a particular case, the light emitting device may include a vertical cavity surface emitting laser.

In a particular case, the feedback control system may operate while the transmission light signal is sent through the optical fiber.

Optionally, the optical communication apparatus may comprise an automatic power controlling system that controls intensity of light emitted by the light emitting device so as to keep the intensity of light at a constant level based on the intensity of the portion of the transmission light signal.

Still optionally, the light emitting device may includes a vertical cavity surface emitting laser.

In a particular case, the automatic power controlling system may operate after the feedback control system moves the position of the transmission light signal to the center of the core of the optical fiber.

Optionally, the optical communication apparatus may comprise a photodetector which detects the intensity of the portion of the transmission light signal. The intensity of the portion of the transmission light signal detected by the photodetector is used by the feedback control system and the automatic power controlling system.

In a particular case, the feedback control system may produce a wobbling motion of the position of the transmission light signal on the entrance surface using the deflecting system so as to detect a change of the intensity of the portion of the transmission light signal during the wobbling motion, the wobbling motion having a predetermined frequency smaller than a frequency band of optical communications using the transmission light signal. Further, the feedback control system obtains a distance between the position of the transmission light signal and the center of the core of the optical fiber based on the detected change of the intensity during the wobbling motion, the distance being used to move the position of the transmission light signal to the center of the core of the optical fiber.

Optionally, the automatic power controlling system may detect the intensity of the portion of the transmission light signal at a predetermined sampling frequency, the predetermined sampling frequency is lower than the predetermined frequency of the wobbling motion.

Still optionally, the intensity of the portion of the transmission light signal may be detected as an average of the intensity of the portion of the transmission light signal during a time period corresponding to one cycle of the sampling frequency.

According to another aspect of the present invention, there is provided an optical communication apparatus, which is provided with a light emitting device that emits a transmission light signal which is modulated with transmission data, an optical fiber having an entrance surface into which the transmission light signal enters, and an automatic power controlling system that controls intensity of light emitted by the light emitting device so as to keep the intensity of light at a constant level based on intensity of the portion of the transmission light signal. In this structure, the intensity of the portion of the transmission light signal is detected by the automatic power controlling system after the transmission light signal enters the entrance surface of the optical fiber.

With this structure, since the portion of the transmission light signal is detected after the transmission light signal enters the optical fiber, it is possible to obtain intensity information which properly indicates intensity of light propagating through the core of the optical fiber.

According to another aspect of the present invention, there is provided a method for moving a transmission light signal to a center of a core of an optical fiber on an entrance surface of the optical fiber, which includes (a) producing a wobbling motion of the position of the transmission light signal on the entrance surface, the wobbling motion having a predetermined frequency smaller than a frequency band of optical communications using the transmission light signal; (b) detecting a change of the intensity of the portion of the transmission light signal during the wobbling motion; and (c) obtaining position data of the transmission light signal with respect to the center of the core of the optical fiber based on the detected change of the intensity during the wobbling motion.

BRIEF DESCRIPTION OF THE ACCOMPANYING DRAWINGS

FIGS. 5A–5C are graphs showing the variation of intensity of light during the wobbling motion in conditions shown in FIGS. 4A, 4B and 4C, respectively;

FIGS. 7A and 7B are graphs showing the variation of intensity of light during the wobbling motion in conditions shown in FIGS. 6A and 6B, respectively;

Figure 10:
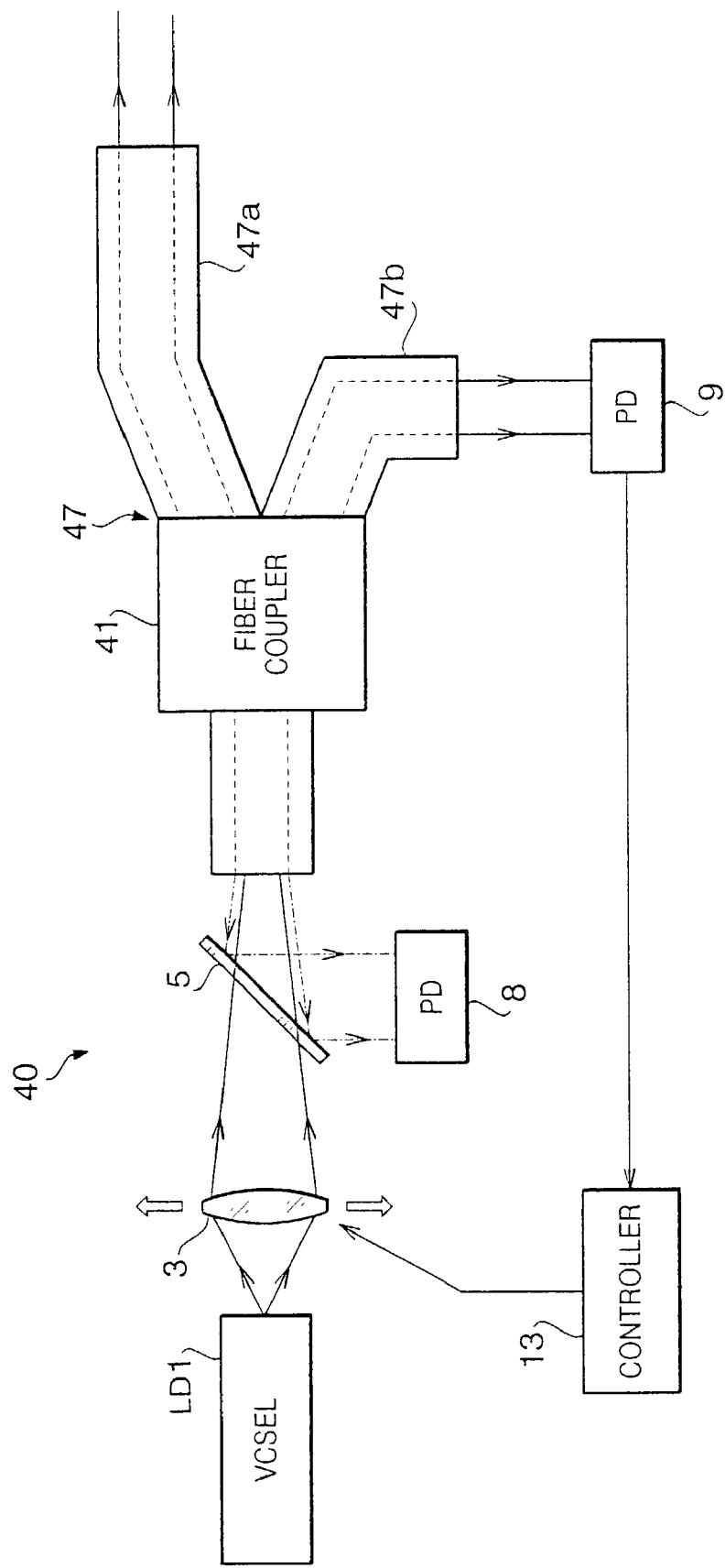
FIG. 10 shows a block diagram of an optical communication module according to a second embodiment of the present invention.
Figure 11A:
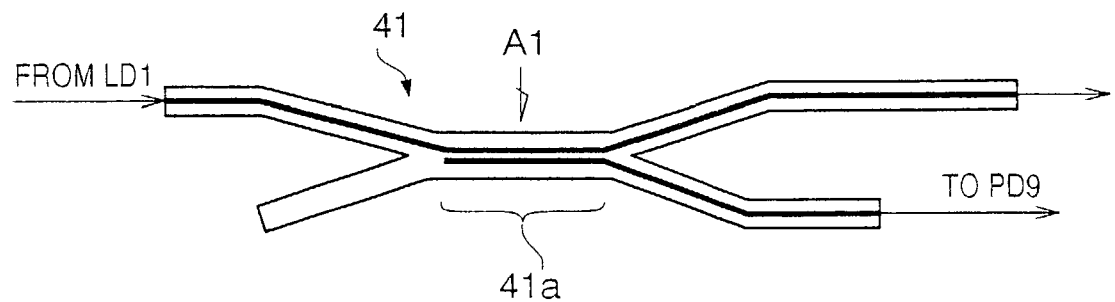
Figure 11B:
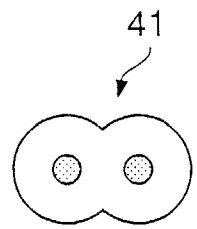
Figure 12:
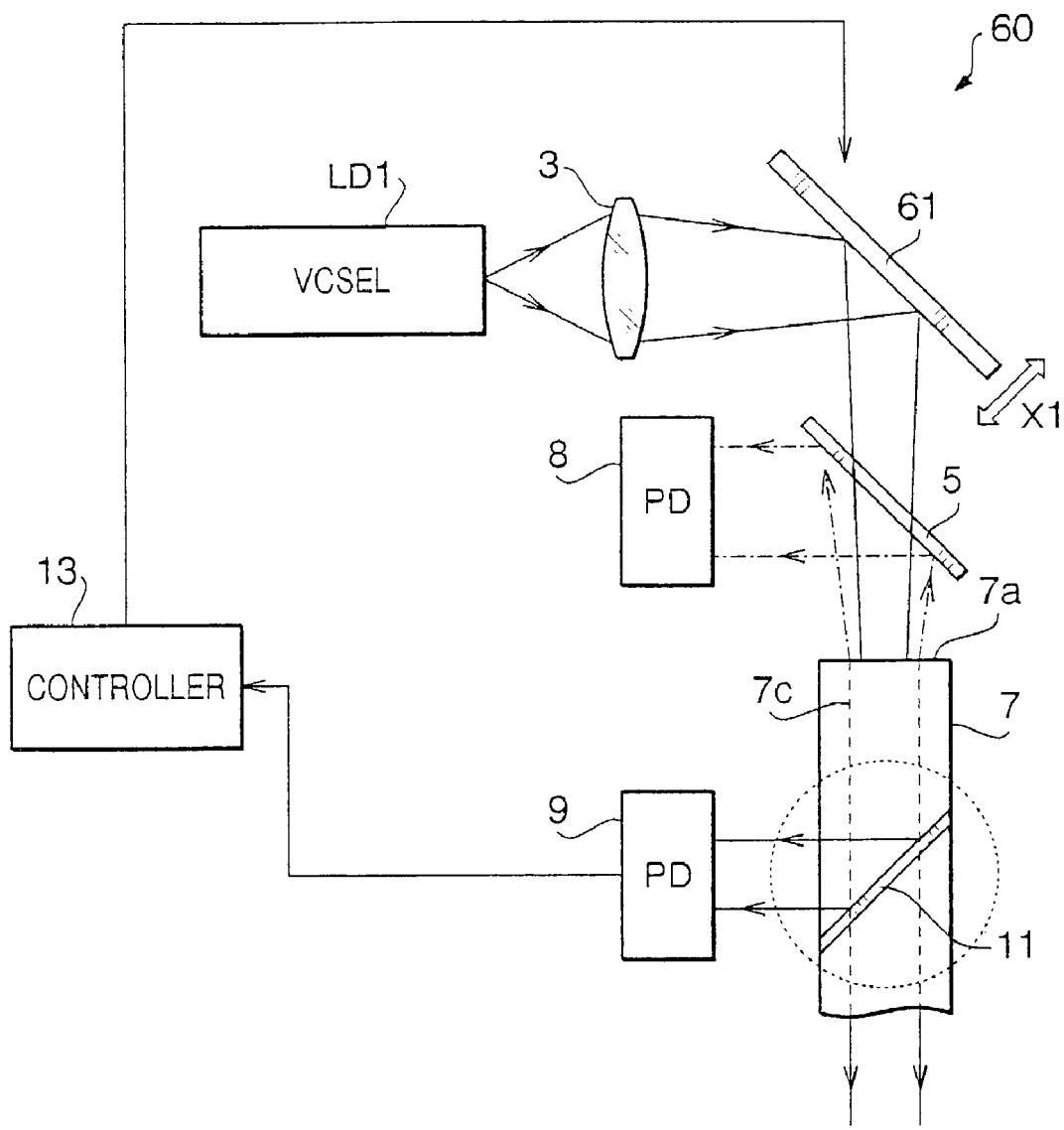
Figure 13:
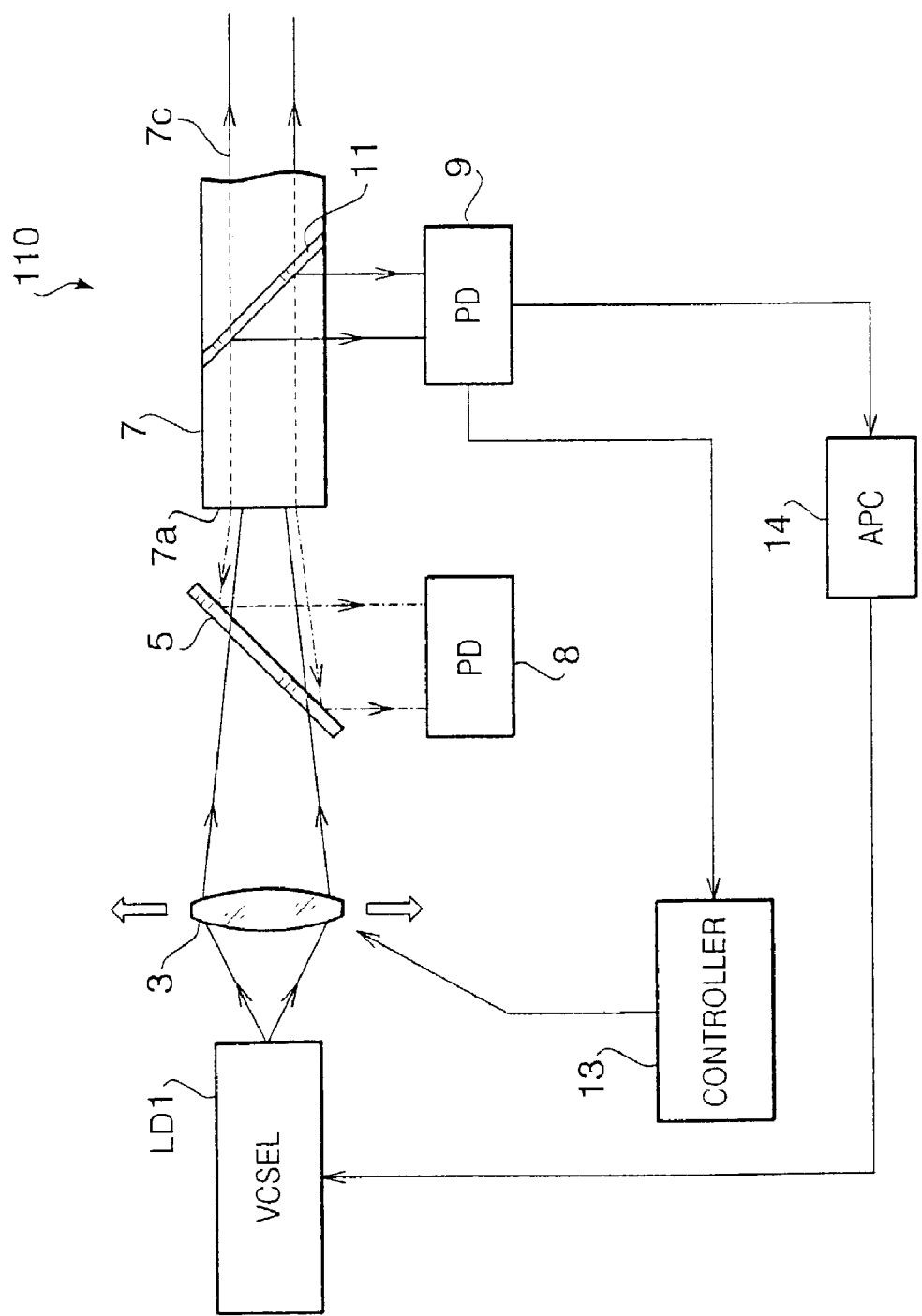

FIGS. 11A and 11B schematically show an example of a configuration of a fiber coupler shown in FIG. 10;

FIG. 12 shows a block diagram of an optical communication module according to a third embodiment of the present invention; and FIG. 13 shows a block diagram of an optical communication module according to a fourth embodiment of the present invention.

DETAILED DESCRIPTION OF THE EMBODIMENTS

Hereinafter, embodiments according to the invention are described with reference to the accompanying drawings.

First Embodiment

Figure 1:
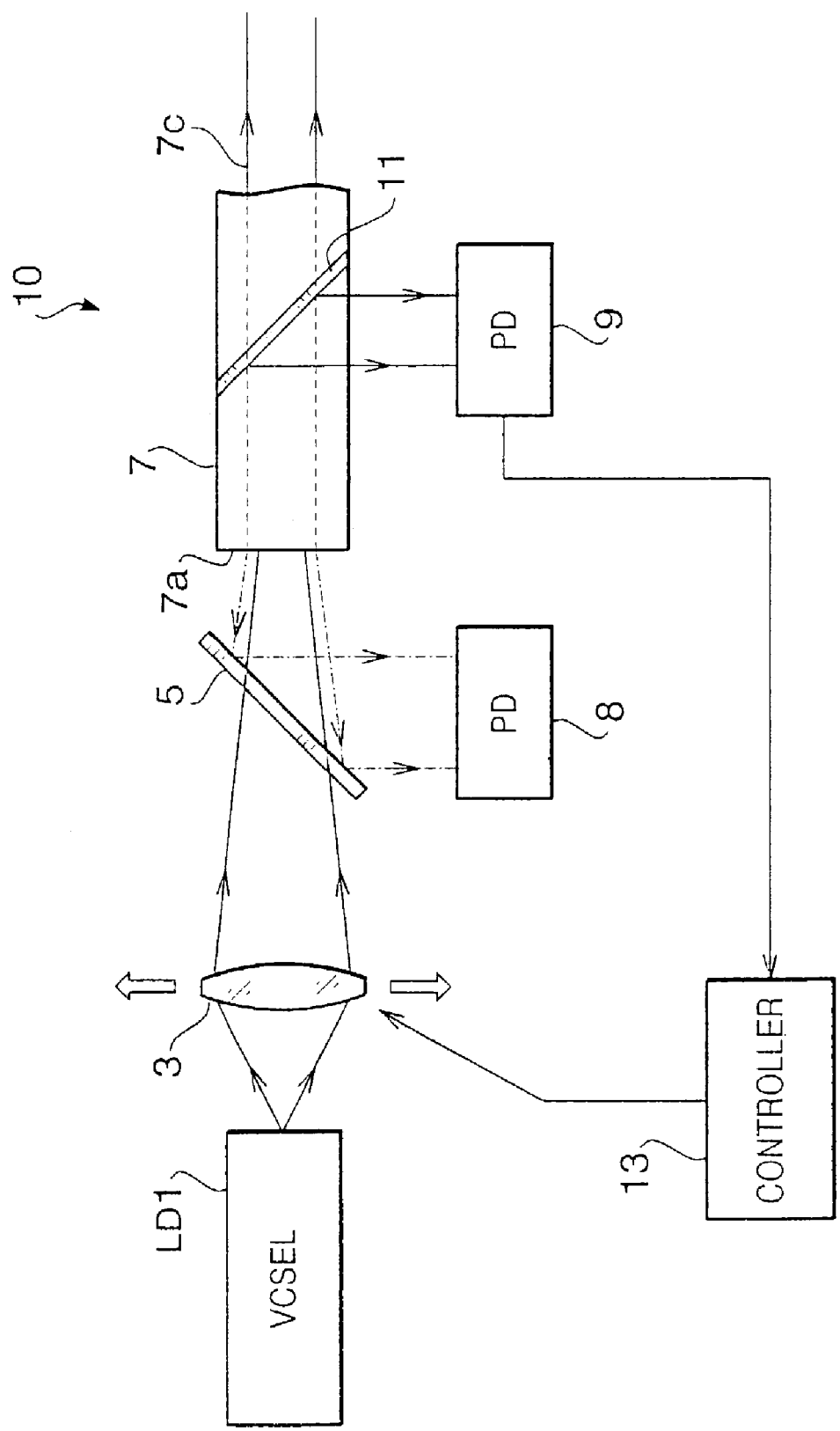
FIG. 1 shows a block diagram of an optical communication module according to a first embodiment of the present invention.

FIG. 1 shows a block diagram of an optical communication module 10 according to a first embodiment of the present invention. The optical communication module 10 is configured to transmit an transmission light signal having 1.3 µm wavelength and to receive an input light signal having 1.5 µm wavelength through an optical fiber 7 so as to enable bidirectional optical communications. In FIG. 1, the transmission light signal (1.3 µm wavelength light) is indicated by an solid line arrow, and the input light signal (1.5 µm wavelength light) is indicated by an dashed line arrow.

As shown in FIG. 1, the optical communication module 10 includes a semiconductor laser LD1 which is a vertical cavity surface emitting laser (VCSEL) having relatively small angle of emission, a condenser lens 3, a WDM (Wavelength Division Multiplexing) filter 5, and the optical fiber 7, each of which is located along a common optical axis (not shown). The semiconductor laser LD1 is configured to modulate the 1.3 µm wavelength light (the transmission light signal) emitted therefrom according to transmission data.

Although, in this embodiment, VCSEL is used as a light emitting device, other suitable light emitting devices, such as other types of semiconductor laser, a LED (Light Emitting Diode) or the like, may be used.

The 1.3 µm wavelength light emitted by the semiconductor laser LD1 is converged by the condenser lens 3 on a surface 7a of the optical fiber 7 through the WDM filter 5. The WDM filter 5 is configured to pass the 1.3 µm wavelength light toward the optical fiber 7 and to reflect the 1.5 µm wavelength light.

The optical communication module 10 further includes a photodetector 8 which receives the 1.5 µm wavelength light (the input light signal) which is transmitted from a remote site through the optical fiber 7, emerges from the surface 7a, and then is reflected by the WDM filter 5. The input light signal received by the photodetector 8 is converted to an electrical signal so as to be demodulated.

Next, negative feedback control of a position of a beam spot on the surface 7a of the optical fiber 7 will be described in detail. The optical communication module 10 is further provided with a photodetector 9, a controller 13, an X actuator 15, and an Y actuator 17, each of which contributes to the negative feedback control (see FIGS. 1 and 3).

As shown in FIG. 1, the optical fiber 7 has a half mirror 11 which reflects a portion of the transmission light signal (1.3 µm wavelength light) toward the photodetector 9 connected to the controller 13. The remaining portion of the transmission light signal passes through the half mirror 11. With this structure, the controller 13 obtains intensity of the portion of the transmission light signal reflected by the half mirror 11.

Figure 2:
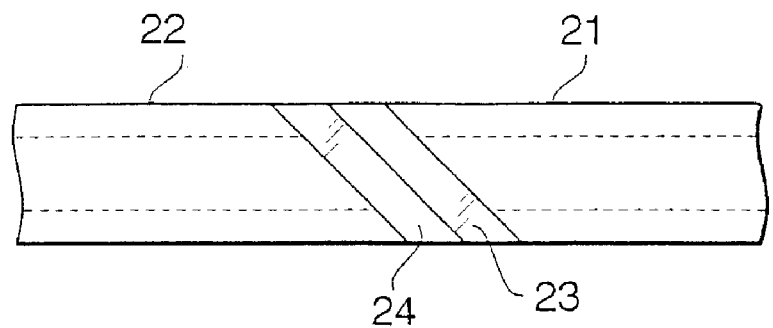
FIG. 2 shows an example of a configuration of an optical fiber provided in the optical communication module shown in FIG. 1.

As shown in FIG. 2, an optical fiber 7 can be fabricated, for example, by bonding a first fiber section 22 having an adhesive cement 24 on its end surface to a second fiber section 21 provided with a half mirror 23 on its end surface.

Figure 3:
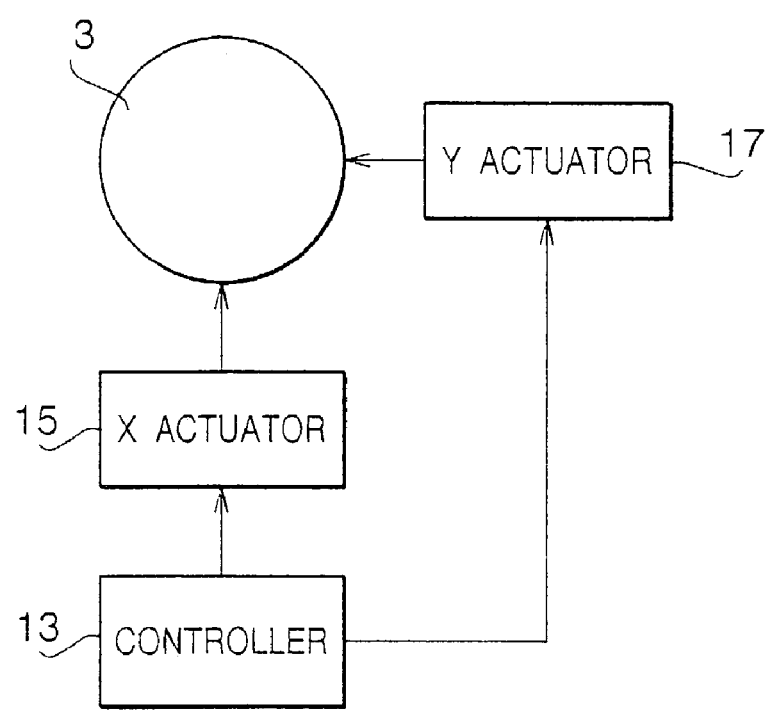
FIG. 3 shows a block diagram of a portion of the optical communication module including an X actuator and a Y actuator.

As shown in FIG. 3, the controller 13 is capable of moving the condenser lens 3 in a plane perpendicular to the optical axis by using the X actuator 15 and the Y actuator 17. The X actuator 15 moves the condenser lens 3 in an X direction, while the Y actuator 17 moves the condenser lens 3 in a Y direction perpendicular to the X direction. With this structure, the controller 13 controls the position of the beam spot on the surface 7a in the X direction and the Y direction.

The controller 13 performs wobbling motion of the condenser lens 3, i.e., wobbling motion of the beam spot on the surface 7a. The term "wobbling motion" as used herein means minute reciprocating motion with a substantially constant period and amplitude. As described in detail below, by performing wobbling motion of the beam spot on the surface 7a, the controller 13 obtains the position of the beam spot on the surface 7a with respect to a center position of a core 7c (see FIG. 4) of the optical fiber 7. The controller 13 directs the beam spot on the surface 7a to the center position of the core using the obtained position of the beam spot.

A frequency of the wobbling motion of the beam spot is sufficiently low in comparison with a frequency band of data transmission using the transmission light signal. Therefore, the controller 13 can obtain a variation of the intensity of the portion of the transmission light signal caused only by the wobbling motion of the beam spot when data transmission using the transmission light signal is performed.

The wobbling motion to detect the position of the beam spot on the surface 7a with respect to the center position of the core of the optical fiber 7 will be described with reference to FIGS. 4A–7.

Figure 4A:
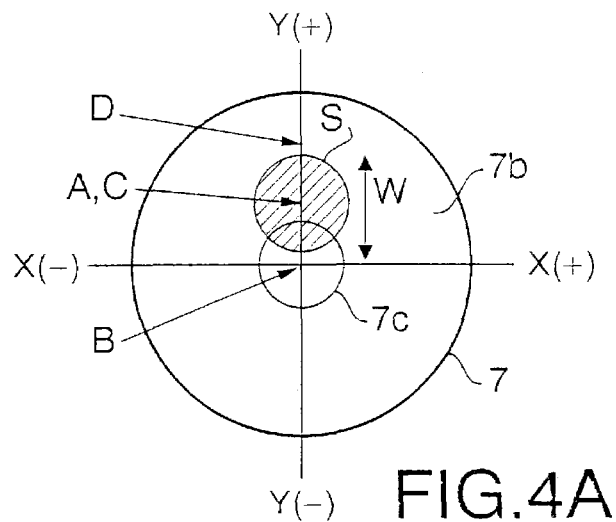
FIGS. 4A–4C show wobbling motion performed at respective positions of an transmission light signal.
Figure 4B:
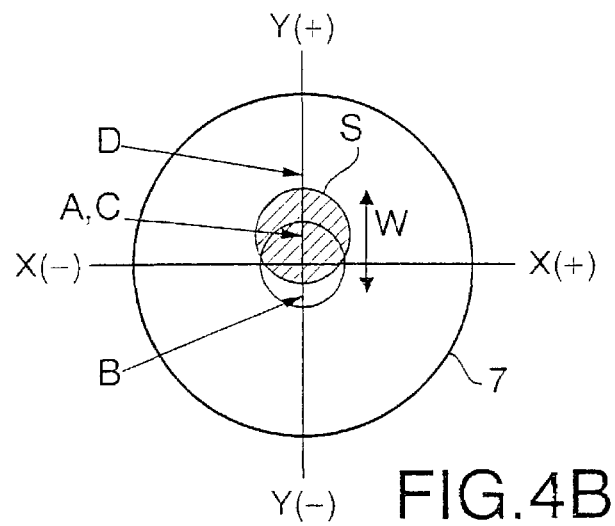
Figure 4C:
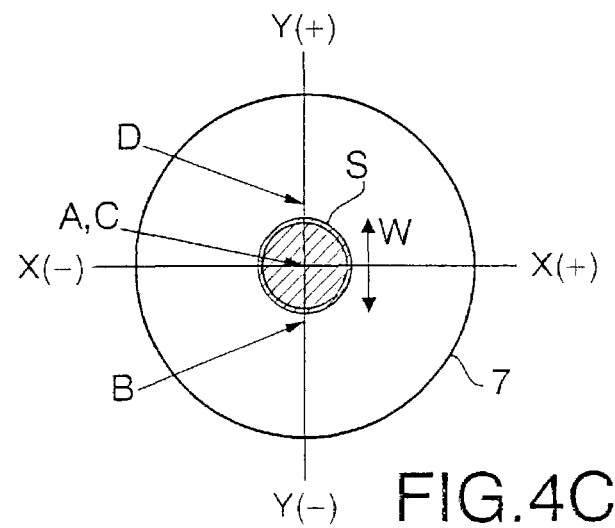

Each of FIGS. 4A–4C shows the surface 7a of the optical fiber 7 viewed along the optical axis so as to illustrate the wobbling motion of the beam spot S formed by the condenser lens 3. In each of FIGS. 4A–4C, an arrow W represents the amplitude and the direction of the wobbling motion at a respective position.

In each of FIGS. 4A–4C the wobbling motion is performed in the Y direction. It should be appreciated that alternative to the wobbling motion in the Y direction, the wobbling motion may be performed in the X direction.

FIG. 4A shows a case where the transmission light signal (the beam spot S) is shifted to the plus direction along the Y axis. FIG. 4B shows a case where the transmission light signal is shifted to the plus direction along the Y axis by a relatively small distance in comparison with the case shown in FIG. 4A. FIG. 4C shows a case where the transmission light signal (the beam spot S) substantially coincides with the center of the core 7c. In each of FIGS. 4A–4C, "A" (or "C") corresponds to a current position of the center of the beam spot S (i.e., a current position of the transmission light signal when the wobbling motion is not performed), "B" corresponds to a bottom position during the wobbling motion, and "D" corresponds to a top position during the wobbling motion.

That is, the beam spot S moves in the order of A→B→C→D→A during the wobbling motion, and repeats the cycle of A→B→C→D→A.

FIGS. 5A, 5B and 5C are graphs showing the variation of the intensity of light detected by the photodetector 9 during the wobbling motion in the conditions shown in FIGS. 4A, 4B and 4C, respectively. In each graph, a lateral axis represents a position of the center of the beam spot S, and a vertical axis represents the intensity of light detected by the photodetector 9.

In each of FIGS. 5A–5C, Pa, Pb, Pc and Pd represent intensity values at positions A, B, C and D, respectively.

In the condition shown in FIG. 5C (4C), the graph 113 exhibits its maximum value at positions A and C because the position of the beam spot S coincides with the center position of the core 7c at positions A and C. When the beam spot S is located at the positions B and D each of which corresponds to an outermost position with respect to the position A, the graph 113 exhibits its minimum value (Pb or Pd). The graph 113 has the form of a sin wave.

As can be seen from FIG. 5C, the variation of intensity of light received by the photodetector 9 in the condition shown in FIG. 5C (4C) can be defined by the following condition (1):

$$Pb=Pd, Pa=Pc \quad (1)$$

The graph 112 of FIG. 5B shows the variation of the intensity of light when the wobbling motion is performed under the condition shown in FIG. 4B. When the beam spot S is located at the position A, since the beam spot S is slightly shifted from the center of the core 7c, the intensity value is slightly lower than its maximum value (81). As the beam spot S moves from the position A to the position B, the intensity values increases to its maximum value (81), and then decreases to an intermediate value (82). As the beam spot S moves from the position B to the position C, the intensity vale increases from the intermediate value 82 to its maximum value (83), and then decreases to the value slightly smaller than the maximum value.

As the beam spot S moves from the position C to the position D, the beam spot S moves away from the center of the core 7c. Therefore, the intensity value decreases, and reaches its minimum value at the position D. Between the position D and the position A, the intensity value increases gradually.

By making a comparison between the graph 112 and the graph 113, it is appreciated that the graph 112 is characterized in that the intensity value at the position B (Pb) is larger than the intensity value at the position D. Accordingly, the variation of intensity of light received by the photodetector 9 in the condition shown in FIG. 5B (4B) can be defined by the following condition (2):

$$Pb>Pd, Pa=Pc \quad (2)$$

The graph 111 shows the variation of the intensity of light when the wobbling motion is performed under the condition shown in FIG. 4A. When the beam spot S is located at the position A, since the beam spot S is shifted from the center of the core 7c, the intensity value is an intermediate value. As the beam spot S moves from the position A to the position B, the intensity value gradually increases and reaches its maximum value. As the beam spot S moves from the position B to the position C, the intensity vale decreases from the maximum value to the intermediate value.

As the beam spot S moves from the position C to the position D, the intensity value gradually decreases and reaches its minimum value. As the beam spot moves from the position D to the position A, the intensity value increases gradually.

By comparing the graph 111 and the graph 112, it is appreciated that the intensity value Pb on the graph 111 is greater than the intensity value Pb on the graph 112. Accordingly, the variation of intensity of light received by the photodetector 9 in the condition shown in FIG. 5A (4A) can be defined by the following condition (3):

$$Pb>>Pd, Pa=Pc \quad (3)$$

From the above conditions (1), (2) and (3), it is appreciated that (Pd−Pb) decreases (an absolute value of (Pd−Pb) increases), as a center of the wobbling motion moves away from the center of the core 7c to the plus direction along Y axis. That is, (Pd−Pb) represents the position of the transmission light signal (i.e., the position of the center of the beam spot S when the wobbling motion is not performed) with respect to the center of the core 7c.

As the position of the transmission light signal further moves away to the plus direction from the condition shown in FIG. 4A, a phenomenon in which the value (Pd−Pb) starts to decrease gradually occurs. However, it is possible to obtain the position of the transmission light signal by considering that such phenomenon occurs when the transmission light signal moves away by a predetermined distance from the center of the core 7c.

Next, two cases where the centers of the wobbling motion are shifted in a minus direction with respect to the center of the core 7c will be described with reference to FIGS. 6A, 6B, 7A and 7B. Each of symbols shown in FIGS. 6A, 6B, 7A and 7B has the same meaning as that shown in FIGS. 4A–4C and 5A–5C.

Figure 6A:
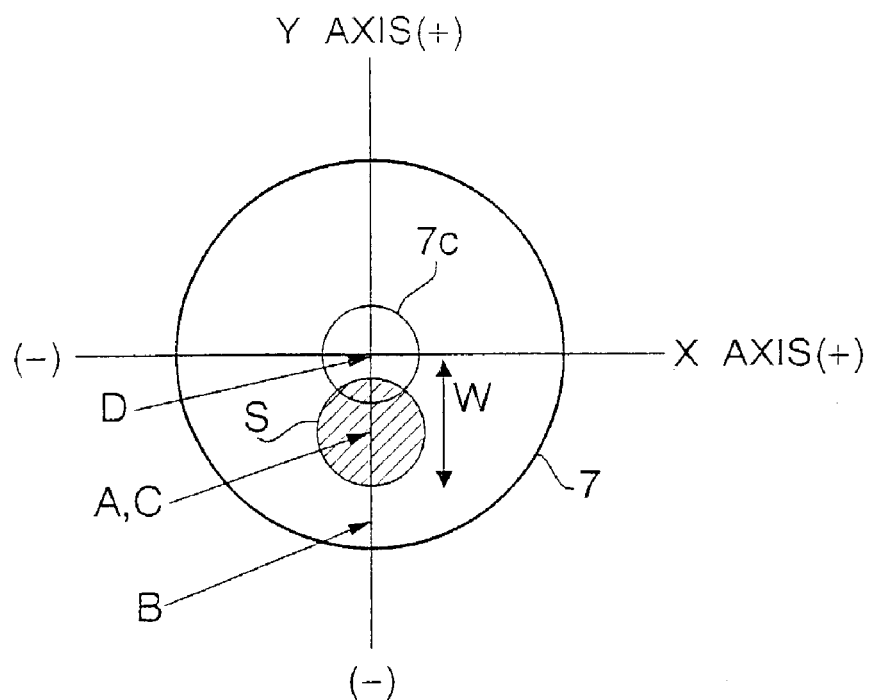
FIGS. 6A and 6B show the wobbling motion performed at respective positions of the transmission light signal.
Figure 6B:
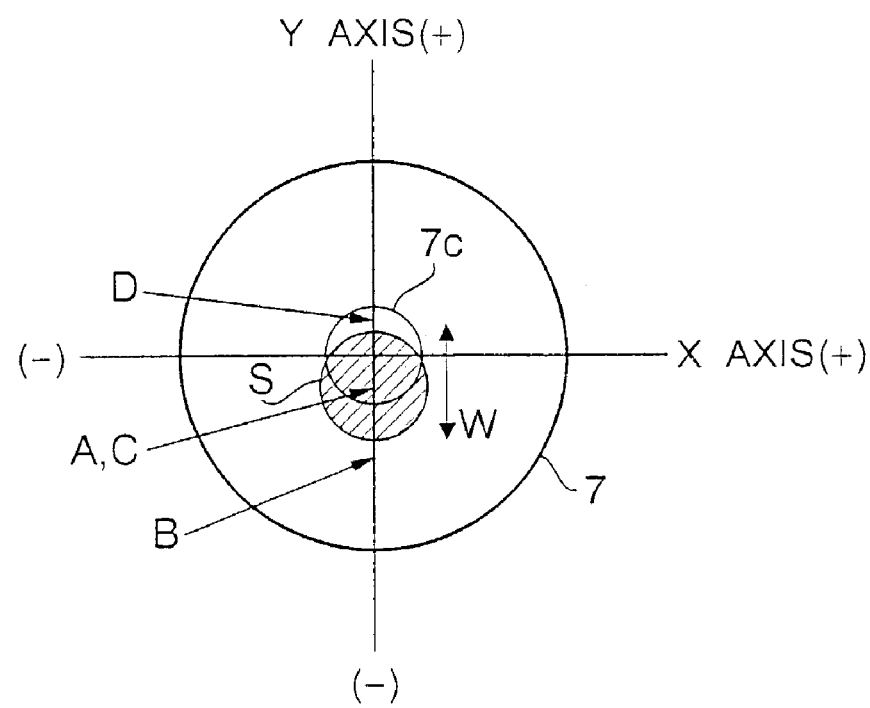

FIG. 7B is a graph 115 showing the variation of the intensity of light when the wobbling motion is performed under the condition shown in FIG. 6B where the center of the wobbling motion is slightly shifted from the center of the core 7c to the minus direction along the Y axis. That is, the transmission light signal shown in FIG. 6B is located at an opposite position of the transmission light signal shown in FIG. 4B along the Y axis.

When the beam spot S is located at the position A, since the beam spot S is slightly shifted from the center of the core 7c to the minus direction along the Y axis, the intensity value is slightly lower than its maximum value. As the beam spot S moves from the position A to the position B, the intensity values decreases gradually to its minimum value. As the beam spot S moves from the position B to the position C, the intensity value increases gradually.

As the beam spot S moves from the position C to the position D, the intensity value reaches its maximum value, and then decreases gradually. As the beam spot S moves from the position D to the position A, the intensity value increases gradually, reaches the maximum value, and then decreases.

As can be seen from the comparison between the graphs 115 and 112, the graph 115 has the same form as the graph 112 and is phase shifted by T/2 (T represents one cycle) with respect to the graph 112.

Similarly to the comparison between the graph 112 and the graph 113, it is appreciated that the graph 115 is characterized in that the intensity value at the position B (Pb) is lower than the intensity value at the position D (Pd). Accordingly, the variation of intensity of light received by the photodetector 9 under the condition shown in FIG. 6B can be defined by the following condition (4):

$$Pb<Pd, Pa=Pc \quad (4)$$

FIG. 7A is a graph 114 showing the variation of the intensity of light when the wobbling motion is performed under the condition shown in FIG. 6A where the center of the wobbling motion is shifted from the center of the core 7c to the minus direction along the Y axis. The shift amount in the case shown in FIG. 6A is larger than that in the case shown in FIG. 6B.

When the beam spot S is located at the position A, since the beam spot S is shifted from the center of the core 7c, the intensity value is an intermediate value. As the beam spot S moves from the position A to the position B, the intensity value gradually decreases and reaches its minimum value at the position B. As the beam spot S moves from the position B to the position C, the intensity value increases from the minimum value to the intermediate value.

As the beam spot S moves from the position C to the position D, the intensity value gradually increases and reaches its maximum value at the position D. As the beam spot moves from the position D to the position A, the intensity value decreases gradually.

Similarly to the comparison between the graph 111 and the graph 112, it is appreciated that the intensity value Pd on the graph 114 is greater than the intensity value Pd on the graph 115. Accordingly, the variation of intensity of light received by the photodetector 9 under the condition shown in FIG. 6A can be defined by the following condition (5):

$$Pb \ll Pd, Pa = Pc \quad (5)$$

From the conditions (3), (4) and (5), it is appreciated that (Pd−Pb) increases, as the center of the wobbling motion moves away from the center of the core 7c to the minus direction along Y axis. That is, (Pd−Pb) represents the center position of the beam spot S with respect to the center of the core 7c.

Furthermore, the sign of (Pd−Pb) indicates whether the beam spot S shifts the plus direction or the minus direction with respect to the center of the core 7c.

Accordingly, it is possible to perform negative feedback control of the beam spot S on the surface 7a so as to move the beam spot S to the center of the core 7c based on the variation of the intensity of light received by the photodetector 9.

It should be appreciated that the negative feedback control using the wobbling motion along the X axis can also be performed in accordance with the above-mentioned principle as to the wobbling motion along the Y axis.

Figure 8:
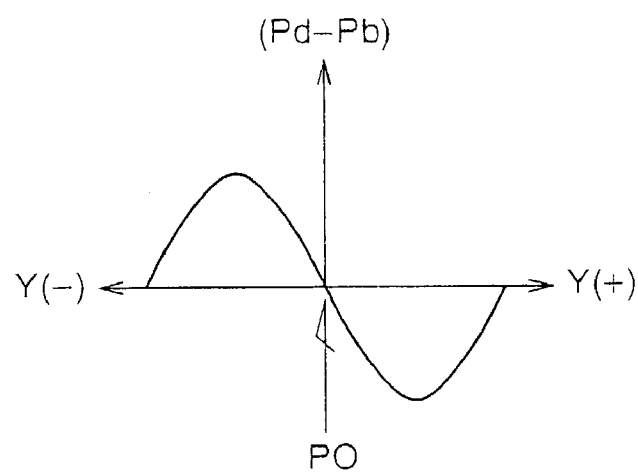
FIG. 8 shows a relationship between (Pd−Pb) and a current position of the transmission light signal.

FIG. 8 shows a relationship between (Pd−Pb) and the current position of the transmission light signal (i.e., the center of the wobbling motion). In FIG. 8, a position P0 corresponds to the center of the core 7c. As described above, when the transmission light signal is located on the plus side from the center of the core 7c, the sign of (Pd−Pb) is minus, and when the transmission light signal is located on the minus side from the center of the core 7c, the sign of (Pd−Pb) is plus.

As the center of the wobbling motion (Pd−Pb) moves away from the center of the core 7c (P0) to the plus direction along Y axis (or X axis), (Pd−Pb) decreases gradually from zero to its minimum value, and then increases gradually. As the center of the wobbling motion (Pd−Pb) moves away from the center of the core 7c (P0) to the minus direction along Y axis (X axis), (Pd−Pb) increases gradually from zero to its minimum value, and then decreases gradually.

By sampling intensity values of light received by the photodetector 9 during the wobbling motion, controller 13 can obtains the value of (Pd−Pb) as to the current position of the transmission light signal. The controller 13 performs the negative feed back control of the position of the transmission light signal based on the obtained value of (Pd−Pb) and the relationship shown in FIG. 8.

By performing the wobbling motion in two directions (X and Y directions), the transmission light signal is accurately directed to the center of the core 7c.

Figure 9:
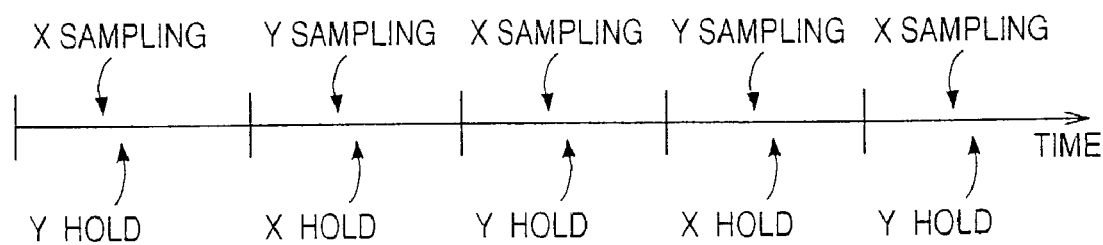
FIG. 9 shows an example of a process of the wobbling motion in two directions.

FIG. 9 shows an example of a process of the wobbling motion in the two directions. In the example shown in FIG. 9, the position of the transmission light signal along Y axis is held at a position corresponding to a result of the preceding wobbling motion (sampling) along the Y axis while the wobbling motion along the X axis is performed. The position of the transmission light signal along X axis is held at a position corresponding to a result of the preceding wobbling motion (sampling) along the X axis while the wobbling motion along the Y axis is performed. That is, the sampling and holding are alternately performed in two directions.

It should be noted that the process of the wobbling motion in the two direction is not limited to the example shown in FIG. 9, and other processes may be employed for the wobbling motion in the two directions.

The above-mentioned negative feedback control utilizing the wobbling motion may be performed periodically such as daily, weekly or monthly. If the optical communication module 10 is used in a fine environmental condition, for example, where the important consideration is only the variation with age (i.e., the variation of ambient temperature and the mechanical conditions are negligible), the negative feedback control utilizing the wobbling motion may be performed at relatively long time intervals.

If the optical communication module 10 is used in a relatively hostile environmental condition, for example, where vibrations occur continuously, the negative feedback control utilizing the wobbling motion may be performed on a steady basis.

Second Embodiment

FIG. 10 shows a block diagram of an optical communication module 40 according to a second embodiment of the present invention. In FIG. 10, to elements which are similar to those in FIG. 1, the same reference numbers are assigned, and the detailed description thereof will not be repeated.

In the optical communication module 40, an optical fiber 47 is used in place of the optical fiber 7 in FIG. 1. The optical fiber 47 has a fiber coupler 41 which passes a portion of the transmission light signal to a fiber section 47b so that intensity of the portion of the transmission light signal is detected by the photodetector 9. The remaining portion of the transmission light signal is transmitted through a fiber section 47a.

Similarly to the first embodiment, the portion of the transmission light signal is detected by using the optical fiber 47 having the fiber coupler 41. Therefore, the negative feedback control of the position of the transmission light signal can also be accomplished by the optical communication module 40.

FIGS. 11A and 11B schematically show an example of a configuration of the fiber coupler 41. As shown in FIG. 11A, the fiber coupler 11A has a coupling section 41a where two cores are formed adjacent to each other. FIG. 11B is a cross section of the fiber coupler 41 along line A1. The portion of the transmission light signal is coupled from one core to another core in the coupling section 41a.

It should be noted that other configurations for extracting the potion of the transmission light signal from the optical fiber after the transmission light signal enters into the optical fiber may be used in place of the configuration for extracting the portion of the transmission light signal shown in FIG. 1 or FIG. 11.

Third Embodiment

FIG. 12 shows a block diagram of an optical communication module 60 according to a third embodiment of the present invention. In FIG. 12, to elements which are similar to those in FIG. 1, the same reference numbers are assigned, and the detailed description thereof will not be repeated.

As shown in FIG. 12, in the optical communication module 60, the optical fiber 7 having the half mirror 11 is used as the configuration for extracting the potion of the transmission light signal after the transmission light signal enters into the optical fiber 7 through the surface 7a.

The optical communication module 60 has an galvano mirror 61 as a deflector. The transmission light signal emitted by the semiconductor laser LD1, passes through the condenser lens 3, and then reflected by the galvano mirror 61. The transmission light signal reflected from the galvano mirror 61 is incident on the surface 7a of the optical fiber 7 through the WDM filter 5.

The galvano mirror 61 is rotatably attached to a casing (not shown) of the optical communication module 60 so that the beam spot S on the surface 7a is moved in the X direction and the Y direction. The galvano mirror 61 is configured to be rotatable in a direction X1 about a rotational axis and in another direction Y1 (not shown) substantially perpendicular to the direction X1 about another rotational axis.

With this structure, similarly to the first embodiment, the negative feedback control of the position of the transmission light signal is accomplished by the optical communication module 60.

It should be noted that other configurations for deflecting the transmission light signal may be used in place of the configuration for deflecting the transmission light signal shown in FIG. 1 or FIG. 12.

In each of the above-mentioned first, second and third embodiments, the two dimensional negative feedback control of the beam spot S is performed. It is appreciated that if the position of the condenser lens 3 can be moved in the optical axis thereof (i.e., along Z direction), three dimensional negative feedback control of the beam spot S can be accomplished. In such a case, the controller 13 can perform auto focus control of the beam spot S by monitoring the intensity of light received by the photodetector 9 while moving the condenser lens 3 in the optical axis (i.e., Z direction).

Fourth Embodiment

FIG. 13 shows a block diagram of an optical communication module 110 according to a fourth embodiment of the present invention. In FIG. 13, to elements which are similar to those in FIG. 1, the same reference numbers are assigned, and the detailed description thereof will not be repeated.

As shown in FIG. 13, the optical communication module 110 includes an APC (Automatic Power Control) circuit 14 to which the phtodetector 9 is connected. The intensity of light received by the photodetector 9 is sent to the APC circuit 14 as well as the controller 13. The APC circuit 14 performs an automatic power control (APC) operation in accordance with the intensity value sent by the photodetector 9 such that the intensity of the beam spot S on the surface 7a is kept at a predetermined constant intensity value.

The APC operation and the wobbling motion for the negative feedback control of the position of the transmission light signal may be performed in parallel. In this case, lower sampling frequency than the frequency of the wobbling motion is selected for the APC operation. Also, in this case, each of the sampled intensity values used for the APC operation is an average in a predetermined time period including at least one cycle of the wobbling motion. This parallel process of the APC operation and the wobbling motion is effective in a case where the optical communication module 110 is used in the relatively hostile environmental condition.

Alternative to the parallel process of the APC operation and the wobbling motion, the APC operation may be performed after the negative feedback control of the position of the transmission light signal using the wobbling motion is completed. In this case, the condenser lens 3 is held at a position at which the beam spot S is located at the center of the core 7c.

According to the fourth embodiment, it becomes possible to perform the APC operation in a situation where the beam spot S is located at the center of the core 7c of the optical fiber 7. Therefore, the APC operation is performed accurately.

Similarly to the fourth embodiment, it is also possible to add the APC circuit 14 to the optical communication module 40 of the second embodiment or the optical communication module 60 of the third embodiment.

In the above-mentioned embodiments, intensity of the transmission light signal is obtained after the transmission light signal enters the optical fiber by using, for example, the half mirror 11. However, it should be appreciated that intensity of the transmission light signal can also be obtained by detecting a portion of the transmission light signal reflected from the surface 7a of the optical fiber 7.

As described above, according to the present invention, an optical communication apparatus which is configure to keep high performance without causing deterioration of performance depending on environmental conditions can be accomplished.

The present disclosure relates to the subject matters contained in Japanese Patent Applications No. 2002-147335, filed on May 22, 2002, and No. 2002-252865, filed on Aug. 30, 2002, which are expressly incorporated herein by reference in their entirety.

What is claimed is:

1. An optical communication apparatus, comprising:
   a light emitting device that emits a transmission light signal which is modulated with transmission data;
   an optical fiber having an entrance surface into which said transmission light signal enters;
   a deflecting system that is located between said light emitting device and said optical fiber so as to move a position of said transmission light signal on said entrance surface of said optical fiber; and
   a feedback control system that controls said deflecting system so as to move the position of said transmission light signal to a center of a core of said optical fiber based on intensity of a portion of said transmission light signal emitted by said light emitting device,
   wherein said intensity of the portion of said transmission light signal is detected by said feedback control system after said transmission light signal enters said entrance surface of said optical fiber.

2. The optical communication apparatus according to claim 1, wherein said optical fiber has a light extracting portion from which the portion of said transmission light signal is extracted, the intensity of the portion of said transmission light signal extracted from said light extracting portion of said optical fiber being detected by said feedback control system.

3. The optical communication apparatus according to claim 2, wherein said light extracting portion includes a half mirror formed in said optical fiber, the intensity of the portion of said transmission light signal reflected by said half mirror being detected by said feedback control system.

4. The optical communication apparatus according to claim 2, wherein said light extracting portion includes a fiber coupler through which the portion of said transmission light signal is directed to said feedback control system.

5. The optical communication apparatus according to claim 1,
wherein said feedback control system produces a wobbling motion of the position of said transmission light signal on said entrance surface using said deflecting system so as to detect a change of the intensity of the portion of said transmission light signal during said wobbling motion, said wobbling motion having a predetermined frequency smaller than a frequency band of optical communications using said transmission light signal,
wherein said feedback control system obtains position data of said transmission light signal with respect to the center of the core of said optical fiber based on the detected change of the intensity during the wobbling motion, said position data being used to move the position of said transmission light signal to the center of the core of said optical fiber.

6. The optical communication apparatus according to claim 5,
wherein said deflecting system is configured to move the position of the transmission light signal on the entrance surface in a first direction and in a second direction perpendicular to the first direction,
wherein said feedback control system performs a first feedback control in which said wobbling motion is produced in the first direction so as to detect the change of the intensity of the portion of said transmission light signal during said wobbling motion in the first direction, and performs a second feedback control in which said wobbling motion is produced in the second direction so as to detect the change of the intensity of the portion of said transmission light signal during said wobbling motion in the second direction,
wherein in the first feedback control, the change of the intensity detected during said wobbling motion in the first direction is used to obtain a first position information of said transmission light signal with respect to the center of the core of said optical fiber in the first direction, said first position information being used to move in the first direction the position of said transmission light signal to the center of the core of said optical fiber,
wherein in the second feedback control, the change of the intensity detected during said wobbling motion in the second direction is used to obtain a second position information of the position of said transmission light signal with respect to the center of the core of said optical fiber in the second direction, said second position information being used to move in the second direction the position of said transmission light signal to the center of the core of said optical fiber.

7. The optical communication apparatus according to claim 6,
wherein said feedback control system performs the first feedback control and the second feedback control alternately,
wherein when the first feedback control is performed, the position of said transmission light signal in the second direction is held at a position which corresponds to a result of a preceding second feedback control,
wherein when the second feedback control is performed, the position of said transmission light signal in the first direction is held at a position which corresponds to a result of a preceding first feedback control.

8. The optical communication apparatus according to claim 1,
wherein said deflecting system includes:
a condenser lens that forms a beam spot of said transmission light signal on said entrance surface of said optical fiber; and
an actuating system that moves said condenser lens so as to move the beam spot on said entrance surface of said optical fiber,
wherein said feedback control system moves said condenser lens using said actuating system so as to move the beam spot to the center of the core of said optical fiber based on the intensity of the portion of said transmission light signal.

9. The optical communication apparatus according to claim 1,
wherein said deflecting system includes:
a galvano mirror that reflects said transmission light signal emitted by said light emitting device toward said entrance surface of said optical fiber; and
an actuating system that moves said galvano mirror so as to move the position of said transmission light signal on said entrance surface of said optical fiber,
wherein said feedback control system moves said galvano mirror using said actuating system so as to move the position of the portion of said transmission light signal on said entrance surface.

10. The optical communication apparatus according to claim 1, wherein said light emitting device includes a vertical cavity surface emitting laser.

11. The optical communication apparatus according to claim 1, wherein said feedback control system operates while said transmission light signal is sent through said optical fiber.

12. The optical communication apparatus according to claim 1, further comprising:
an automatic power controlling system that controls intensity of light emitted by said light emitting device so as to keep the intensity of light at a constant level based on the intensity of the portion of said transmission light signal.

13. The optical communication apparatus according to claim 12, wherein said light emitting device includes a vertical cavity surface emitting laser.

14. The optical communication apparatus according to claim 12, wherein said automatic power controlling system operates after said feedback control system moves the position of said transmission light signal to the center of the core of said optical fiber.

15. The optical communication apparatus according to claim 12, further comprising a photodetector which detects the intensity of the portion of said transmission light signal, the intensity of the portion of said transmission light signal detected by the photodetector being used by said feedback control system and said automatic power controlling system.

16. The optical communication apparatus according to claim 12,
wherein said feedback control system produces a wobbling motion of the position of said transmission light signal on said entrance surface using said deflecting system so as to detect a change of the intensity of the portion of said transmission light signal during said wobbling motion, said wobbling motion having a predetermined frequency smaller than a frequency band of optical communications using said transmission light signal,
wherein said feedback control system obtains a distance between the position of said transmission light signal and the center of the core of said optical fiber based on the detected change of the intensity during the wobbling motion, said distance being used to move the position of said transmission light signal to the center of the core of said optical fiber.

17. The optical communication apparatus according to claim 16, wherein said automatic power controlling system detects the intensity of the portion of said transmission light signal at a predetermined sampling frequency, said predetermined sampling frequency is lower than said predetermined frequency of the wobbling motion.

18. The optical communication apparatus according to claim 17, wherein said intensity of the portion of said transmission light signal is detected as an average of said intensity of the portion of said transmission light signal during a time period corresponding to one cycle of said sampling frequency.

19. An optical communication apparatus, comprising:
a light emitting device that emits a transmission light signal which is modulated with transmission data;
an optical fiber having an entrance surface into which said transmission light signal enters; and
an automatic power controlling system that controls intensity of light emitted by said light emitting device so as to keep the intensity of light at a constant level based on intensity of the portion of said transmission light signal,
wherein said intensity of the portion of said transmission light signal is detected by said automatic power controlling system after said transmission light signal enters said entrance surface of said optical fiber.

20. A method for moving a transmission light signal to a center of a core of an optical fiber on an entrance surface of the optical fiber, comprising:
producing a wobbling motion of the position of said transmission light signal on said entrance surface, said wobbling motion having a predetermined frequency smaller than a frequency band of optical communications using said transmission light signal;
detecting a change of the intensity of the portion of said transmission light signal during said wobbling motion; and
obtaining position data of said transmission light signal with respect to the center of the core of said optical fiber based on the detected change of the intensity during the wobbling motion,
wherein the intensity of the portion of the transmission light signal is detected by a feedback control system after the transmission light signal enters the entrance surface of the optical fiber.

* * * * *